(12) United States Patent
Clifford et al.

(10) Patent No.: US 8,615,492 B1
(45) Date of Patent: Dec. 24, 2013

(54) TECHNIQUES FOR PROVIDING MULTIPLEXED DATA FOR BACKUP

(75) Inventors: Thomas Clifford, Edina, MN (US); Gaurav Malhotra, Siliguri (IN)

(73) Assignee: Symantec Corporation, Mountain View, CA (US)

( * ) Notice: Subject to any disclaimer, the term of this patent is extended or adjusted under 35 U.S.C. 154(b) by 789 days.

(21) Appl. No.: 12/181,614

(22) Filed: Jul. 29, 2008

(51) Int. Cl.
*G06F 7/00* (2006.01)

(52) U.S. Cl.
USPC .......................................... 707/640; 713/193

(58) Field of Classification Search
USPC .......................................... 713/193; 707/640
See application file for complete search history.

(56) References Cited

U.S. PATENT DOCUMENTS

| | | | | |
|---|---|---|---|---|
| 5,548,648 | A * | 8/1996 | Yorke-Smith | 713/193 |
| 6,061,449 | A * | 5/2000 | Candelore et al. | 380/28 |
| 2004/0064485 | A1* | 4/2004 | Yoshida et al. | 707/201 |
| 2005/0246510 | A1* | 11/2005 | Retnamma et al. | 711/162 |
| 2007/0136282 | A1* | 6/2007 | Takashima | 707/6 |
| 2008/0019517 | A1* | 1/2008 | Munguia et al. | 380/210 |

OTHER PUBLICATIONS

"A CommVault White Paper: CommVault Galaxy Backup & Recovery", CommVault Systems, Inc., 2008, 39 pages.
"IBM Tivoli Storage Manager Version 5.5—Using the Application Programming Interface", International Business Machines Corporation, 2007, 308 pages.
"EMC Data Sheet—EMC NetWorker", EMC Corporation, Hopkinton, Massachusetts, © Copyright 2008, 2 pages.

* cited by examiner

*Primary Examiner* — Cheyne D Ly
(74) *Attorney, Agent, or Firm* — Wilmer Cutler Pickering Hale and Dorr LLP

(57) ABSTRACT

Techniques for providing multiplexed data for backup are disclosed. In one particular exemplary embodiment, the techniques may be realized as a method for providing multiplexed data for backup comprising determining one or more criteria for a set of data to be backed up by a backup device, wherein the one or more criteria are based at least in part on reducing encryption overhead for the set of data. The method further includes identifying one or more sets of data to form a multiplexed backup based upon the one or more sets of data meeting the one or more criteria, and transmitting the one or more identified sets of data to the backup device for backup.

19 Claims, 3 Drawing Sheets

TECHNIQUES FOR PROVIDING MULTIPLEXED DATA FOR BACKUP

FIELD OF THE DISCLOSURE

The present disclosure relates generally to multiplexing data and, more particularly, to techniques for providing multiplexed data for backup.

BACKGROUND OF THE DISCLOSURE

Many backup mechanisms enable a rate of backup and/or a backup storage capacity that is greater than that of a client utilizing the backup mechanism. For example, a backup device may accommodate a faster backup rate than the rate at which a server utilizing the backup device may be capable of streaming data. Additionally, a backup mechanism may be capable of storing more data than a server or other client may require backed up. Furthermore, some backup devices may require starting and/or stopping time when a stream of data ends, and waiting to receive a second stream of data to backup. Thus, it may be more efficient to keep a backup device running to enable faster backup completion for one or more backup clients.

Due to a potentially greater storage capacity and a potentially greater backup speed, streams of data from multiple clients may be multiplexed and handled by a single backup mechanism. However, multiplexing may add an additional layer of complexity to backup mechanisms. A backup mechanism and/or associated backup software may be required to track the location of one or more portions of backed up data. Thus, multiplexed data may increase the complexity of managing backups.

Individuals and organizations backing up data may encrypt data to minimize disclosure, loss, and/or tampering with the data. Encryption of data, however, may require the use and/or management of an encryption key. Further, multiplexed data may contain data from different backup clients and may require multiple encryption keys. Ensuring the correct key is associated with the correct portion of data, and efficiently handling the key may be a significant challenge when utilizing multiplexed data.

In view of the foregoing, it may be understood that there are significant problems and shortcomings associated with current backup multiplexing technologies.

SUMMARY OF THE DISCLOSURE

Techniques for providing multiplexed data for backup are disclosed. In one particular exemplary embodiment, the techniques may be realized as a method for providing multiplexed data for backup comprising determining one or more criteria for a set of data to be backed up by a backup device, wherein the one or more criteria are based at least in part on reducing encryption overhead for the set of data identifying one or more sets of data to form a multiplexed backup based upon the one or more sets of data meeting the one or more criteria, and transmitting the one or more identified sets of data to the backup device for backup.

In another particular exemplary embodiment, the techniques may be realized as an article of manufacture for providing multiplexed data for a backup, the article of manufacture comprising at least one processor readable medium; and instructions carried on the at least one medium; wherein the instructions are configured to be readable from the at least one medium by at least one processor and thereby cause the at least one processor to operate so as to determine one or more criteria for a set of data to be backed up by a backup device, wherein the one or more criteria are based at least in part on reducing encryption overhead for this set of data, identify one or more sets of data to form a multiplexed backup based upon the one or more sets of data meeting the one or more criteria and transmit the one or more identified sets of data to the backup device for backup.

In yet another particular exemplary embodiment, the techniques may be realized as a system for providing multiplexed data for a backup comprising one or more processors communicatively coupled to a network, wherein the one or more processors are configured to determine one or more criteria for a set of data to be backed up by a backup device, wherein the one or more criteria are based at least in part on reducing encryption overhead for the set of data, identify one or more sets of data to form a multiplexed backup based upon the one or more sets of data meeting the one or more criteria, and transmit the one or more identified sets of data to the backup device for backup.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
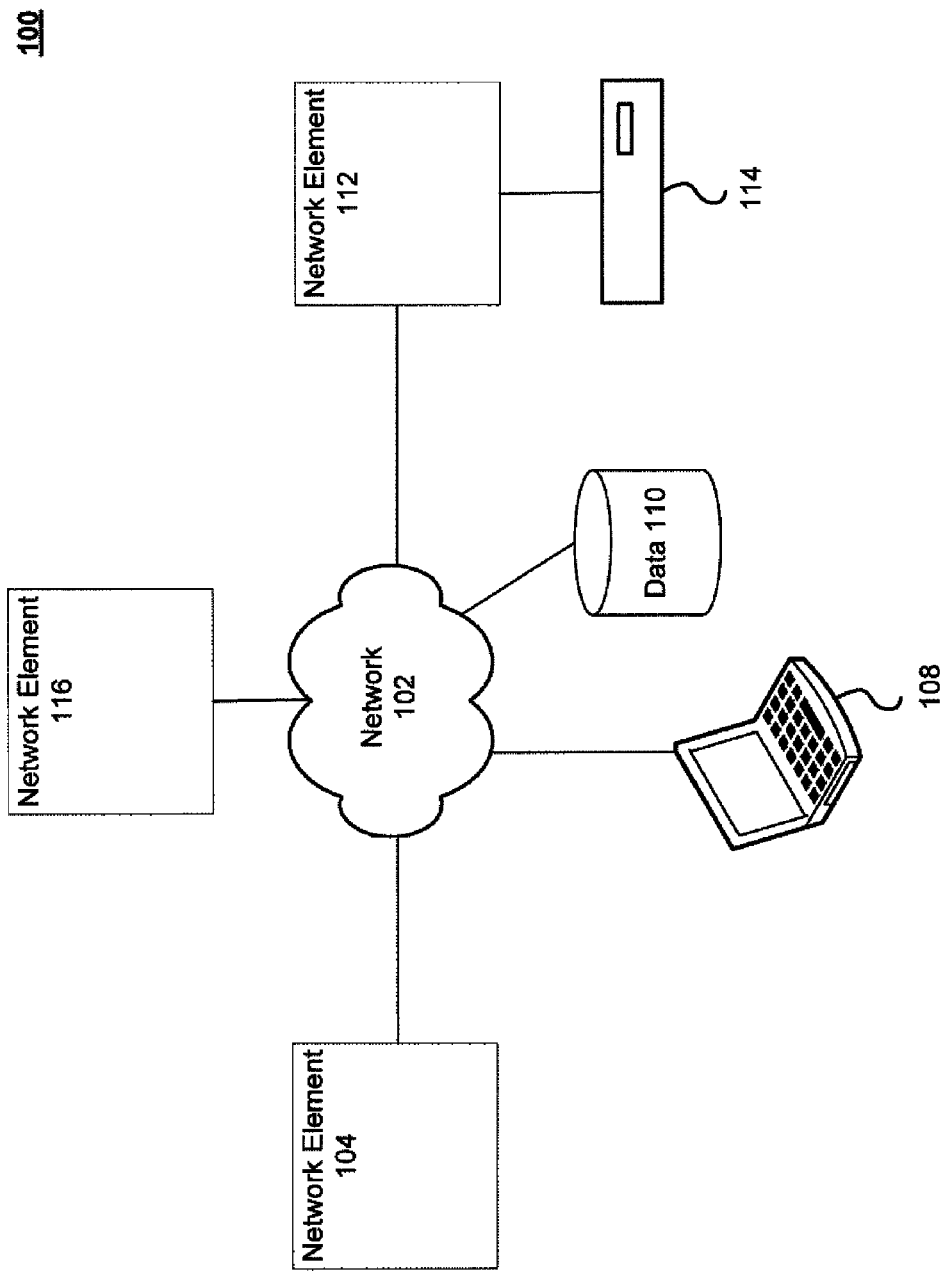
FIG. 1 shows a system for providing multiplexed data for backup in accordance with an embodiment of the present disclosure.

Referring to FIG. 1, there is shown a system 100 for providing multiplexed data for backup in accordance with an embodiment of the present disclosure. FIG. 1 is a simplified view of system 100, which may include additional elements that are not depicted. Network elements 104, 112, and 116 may be communicatively coupled to network 102. Network element 112 may be communicatively coupled to media drive 114. Computer 108 may be communicatively coupled to network 102. Data 110 may also be communicatively coupled to network 102.

Network 102 may be a local area network (LAN), a wide area network (WAN), the Internet, a cellular network, a satellite network, or another network that permits communication between network elements 104, 112 and 116, computer 108 and other devices communicatively coupled to network 102.

Network elements 104, 112, 116 may be application servers, backup servers, network storage devices, media servers or other devices communicatively coupled to network 102. Network elements 104, 112, and 116 may utilize media drive 114 for the storage of application data, backup data, or other data.

Network elements 104 and 116 may be hosts, such as an application server, which may compress/decompress and/or encrypt/decrypt data traveling between network element 104 and/or network element 116 and a backup device.

Network element 112 may be a backup server attached to media drive 114. In one or more embodiments, network element 112 may be capable of encrypting and/or decrypting one or more portions of backup data transferred to and/or received from media drive 114. In other embodiments, network element 112 may represent a network appliance connected to a storage area network. Network element 112 may compress/decompress and/or encrypt/decrypt data traveling between a storage area network and media drive 114.

Computer 108 may be a desktop computer, a laptop computer, a server, or other computer capable of performing private network backbone analysis. Computer 108 may receive data from user input, a database, a file, a web service, and/or an application programming interface. Computer 108 may query other systems and/or local or remote storage such as data 110, network elements 104, 112 and 116, and media drive 114 to obtain backup information. Computer 108 may provide a user interface for administration of one or more backup processes and/or backup mechanisms.

Data 110 may be network accessible storage and may be local, remote, or a combination thereof to network elements 104, 112, and 116. Data 110 may utilize a tape, disk, a storage area network (SAN), or other computer accessible storage. In one or more embodiments, data 110 may represent a database which may be utilized to store backup management software and backup management data. Backup management data may include, for example, a backup catalog, one or more backup policies, and one or more encryption keys.

Media drive 114 may represent a device capable of recording a backup on storage media. In one or more embodiments, it may be a hard disk, flash memory, or other storage. In other embodiments, it may be a tape drive, an automated tape library, a floppy disk drive, other magnetic storage drives, and/or an optical disk drive. In one or more embodiments, media drive 114 may represent a drive that may contain hardware for encrypting and/or decrypting content written to and/or read from storage media. For example, media drive 114 may represent a SCSI (Small Computer Systems Interface) based tape drive that may contain a computer chip for encrypting and/or decrypting data. In one or more embodiments, media drive 114 may support SCSI security protocol out (SPOUT) and/or SCSI security protocol in (SPIN).

Network elements 104, 112, and 116 and media drive 114 may utilize hardware, software, or a combination thereof to perform compression/decompression and/or encryption/decryption. One or more encryption algorithms may be implemented in network elements 104, 112, 116, and/or media drive 114 including data encryption standard (DES), triple DES, advanced encryption standard (AES), and other encryption ciphers. Additional security mechanisms such as security codes, hash functions, and checksums may be also implemented.

Encryption may occur when data is being backed up so that data does not remain outside of a source of origin in an unprotected state. For example, data may be encrypted when a host or a process on a host sends data for backup. Data may also be encrypted when a network appliance retrieves data from a storage area network to send it to a backup device. Data may be encrypted by a backup server and data may also be encrypted by a backup device.

In one or more embodiments, network elements 104 and 116 may be two hosts requiring backup. Backup management software running on network element 112 may determine that media drive 114 has the ability and/or capacity to accommodate backup data streams from two or more hosts. It may be desirable to encrypt and/or compress backups performed by media drive 114. Media drive 114 may receive an encryption key for use in encrypting a first data stream from network element 104. Media drive 114 may receive the key from backup management software running on network element 112, which may utilize SCSI security protocol out (SPOUT). Network element 112 may utilize SCSI security protocol out (SPOUT) to provide the key to media drive 114 and/or to enable encryption on media drive 114. In one or more embodiments, media drive 114 may write a key identifier corresponding to the encryption key in key associated data (KAD) on a storage medium utilized for the backup data.

In some embodiments, media drive 114 may write a key identifier corresponding to the encryption key in a data header on a storage medium utilized for the backup data. A key identifier may enable backup management software or other systems to lookup the appropriate encryption key for one or more portions of backup data.

Utilizing an encryption key may include media drive 114 receiving the encryption key and writing a key identifier prior to beginning to write encrypted and/or compressed data to an associated storage medium. These and/or other overhead steps may affect the efficiency when media drive 114 is required to switch encryption keys. In one or more embodiments, determining which data streams to multiplex may be based at least in part on an encryption key associated with the data stream. For example, if a data stream from network element 116 utilizes the same encryption key as a data stream from network element 104, it may be determined suitable to join a multiplex group currently utilizing media drive 114 for backup.

In one or more embodiments, network element 112 and/or media drive 114 may contain storage for caching data streamed to media drive 114. For example, network element 104 may be a first host utilizing a first encryption key for backup on media drive 114 and network element 116 may be a second host utilizing a second encryption key for backup on media drive 114. In order to minimize the impact on efficiency that may occur when switching between encryption keys, network element 112 and/or media drive 114 may cache data from one or more data streams targeted for backup. This may enable media drive 114 to receive larger amounts of data from a data stream and may reduce the number of switches between keys that media drive 114 may have to perform.

In some embodiments, the amount of cached data utilizing an encryption key may determine, at least in part, whether or not another data stream is multiplexed into a group of data streams utilizing a backup mechanism, such as media drive 114. For example, if there are two data streams currently multiplexed, the addition of a third data stream may be based, at least in part, on the third data stream's usage of the same key being used by a currently multiplexed data stream with a minimum amount of data cached. This may add an additional data stream to a backup operation while further reducing the number of switches between encryption keys necessary for media drive 114 to perform during the backup operation.

In one or more embodiments, encryption and/or compression may be handled by a client, such as network element 104, network element 116, a backup server, a network switch or another network accessible element. Encryption and/or compression may be done prior to sending data to media drive 114 for backup. In some embodiments, a backup may multiplex data encrypted by a client or other network accessible element with data encrypted by media drive 114.

Figure 2:
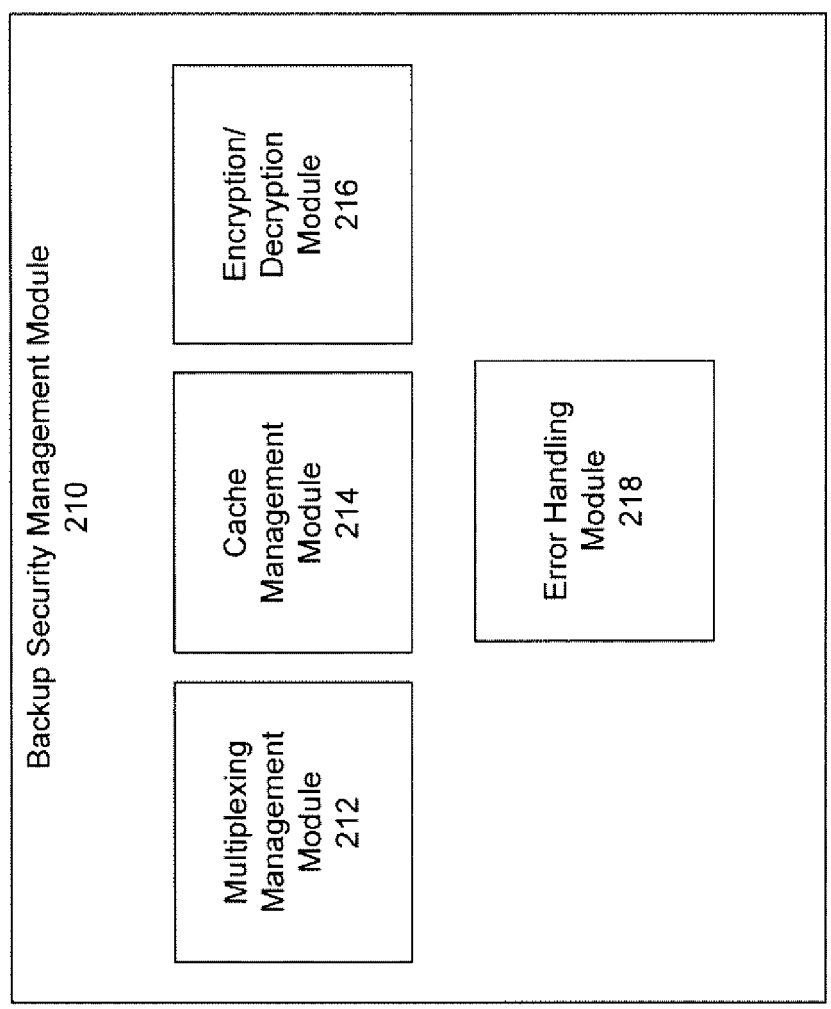
FIG. 2 shows a module for providing multiplexed data for backup in accordance with an embodiment of the present disclosure.

Referring to FIG. 2, there is shown a backup security management module 210 for providing multiplexed data for backup in accordance with an embodiment of the present disclosure. Backup security management module 210 may contain one or more components including multiplexing management module 212, cache management module 214, encryption/decryption module 216, and error handling module 218.

Multiplexing management module 212 may determine and/or apply one or more criteria utilized to determine a multiplex group for a backup mechanism. For example, multiplexing management module 212 may identify multiple data streams utilizing the same encryption key and may multiplex these data streams in order to reduce backup overhead, such as overhead associated with switching and/or managing multiple encryption keys.

Cache management module 214 may enable and manage caching of one or more data streams sent to a backup mechanism. Cache management module 214 may, for example, ensure a minimum amount of data is cached prior to streaming data to a backup mechanism. This may reduce the amount of switching between data streams required for a backup mechanism.

Encryption/decryption module 216 may encrypt or decrypt one or more portions of data. Encryption/decryption module 216 may receive one or more keys for use in encrypting or decrypting one or more portions of data. Encryption/decryption module 216 may provide encryption of data, digital signatures, digital certificates, and other security mechanisms. In one or more embodiments, encryption/decryption module 216 may utilize a plurality of encryption algorithms, such as AES Galois Counter Mode. Encryption/decryption module 216 may utilize SCSI security protocol out (SPOUT) to enable encryption and/or to receive an encryption key. Encryption/decryption module 216 may utilize SCSI security protocol in (SPIN) to provide an encryption status to an administrator and/or to backup management software.

Error handling module 218 may handle errors with encryption, decryption, security policies, catalog management, or other processes. Error handling module 218 may log security errors such as access attempts, incorrect encryption keys, and other security related events.

Figure 3:
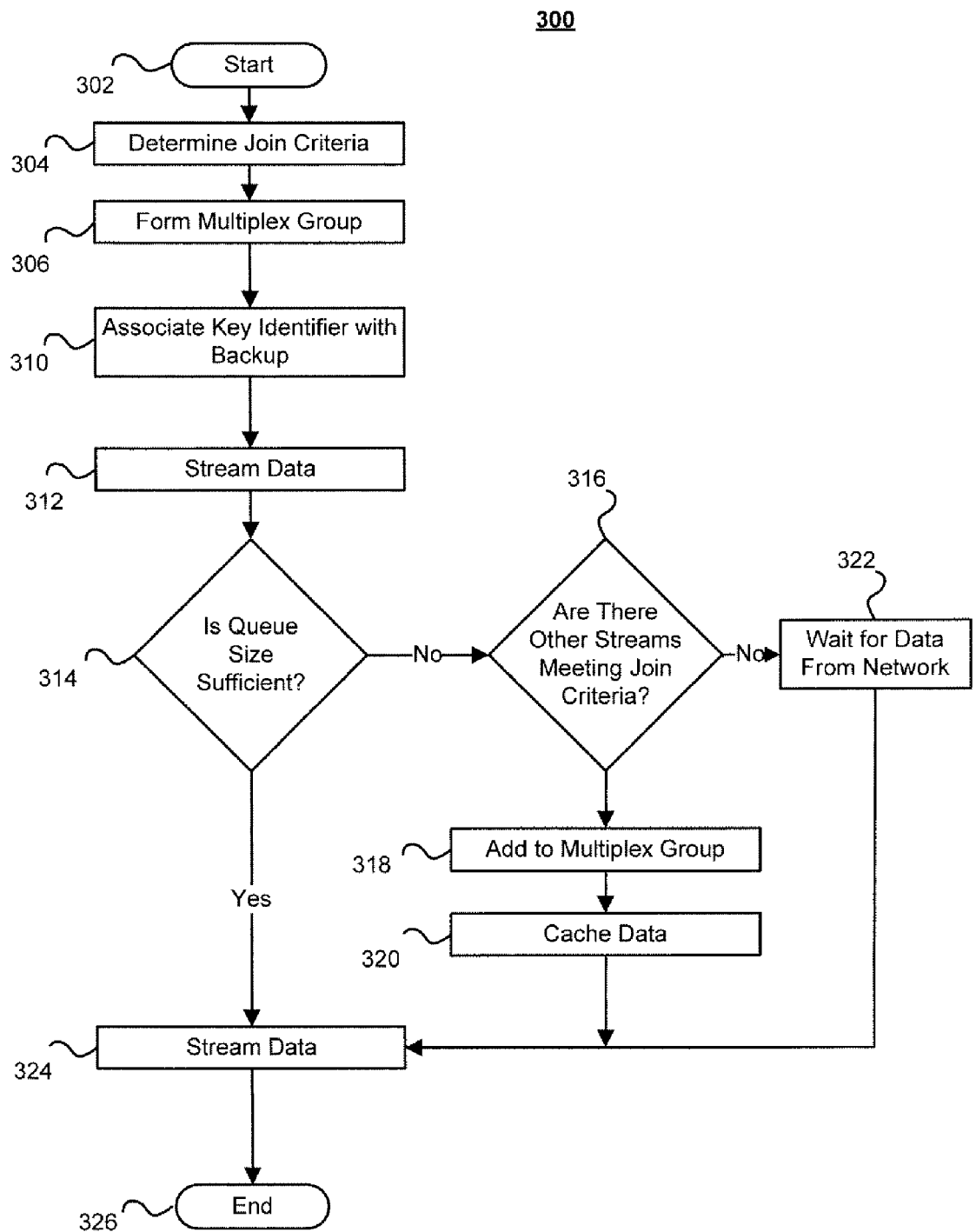
FIG. 3 depicts a method for providing multiplexed data for backup in accordance with an embodiment of the present disclosure.

Referring to FIG. 3, there is depicted a method 300 for multiplexing data streams in accordance with an embodiment of the present disclosure.

At block 302, the method 300 for multiplexing data streams may begin.

At block 304, the method 300 may determine join criteria. Join criteria may be utilized to determine which data streams should be multiplexed together to be handled by a backup mechanism. Join criteria may consider multiple factors such as the source or owner of data to be backed up, the size of data to be backed up, the encryption key or other security measures utilized for data to be backed up, or other factors.

At block 306, a multiplex group may be formed which may include one or more data streams to be backed up by a backup mechanism.

At block 310, a backup mechanism may write one or more key identifiers to a storage medium associated with the backup mechanism. For example, a key identifier may be written to a data header associated with the backup mechanism, in key associated data (KAD) related to the backup mechanism, or otherwise recorded by the backup mechanism. In some embodiments, data may be encrypted by software and/or hardware prior to being provided to a backup mechanism and the backup mechanism may not record a key identifier.

At block 312, a client, a backup management device or software, or another user of a backup mechanism may stream data to the backup mechanism.

At block 314, the method 300 may determine whether a queue size is sufficient and/or optimal for a backup mechanism. In some embodiments, an administrator, such as a user of computer 108 with an administrative authentication, may determine that a backup mechanism has a capacity greater than a current multiplex group. If the queue size is not sufficient, the method 300 may continue at block 316. If the queue size is sufficient, the method 300 may continue at block 324.

At block 316, the method 300 may determine whether other data streams are available to join the multiplex group. The method 300 may do this by applying the previously determined join criteria to evaluate available data streams. If other data streams are available, the method 300 may continue at block 318. If other data streams are not available, the method 300 may continue at block 322.

At block 318, one or more additional streams may be added to the multiplex group.

At block 320, data from one or more streams may be cached. Caching data from one or more streams may enable a backup mechanism to handle a larger portion of data from a data stream before the backup mechanism switches to another data stream. Backing up data streams in larger portions may reduce disruption associated with switching data streams.

If, at block 316, it is determined that other data streams meeting one or more join criteria are not available to add to a multiplex group, the method 300, at block 322, may wait for additional data from one or more data streams currently in the multiplex group.

At block 324, the method 300 may stream the data to a backup mechanism. In some embodiments, the backup mechanism may compress and/or encrypt one or more data streams prior to backing them up. In these embodiments, the method 300 may associate a key identifier with the backup. For example, the method 300 may write a key identifier in key associated data (KAD) on a backup tape or other storage medium, in a data header or in another format associated with the backup medium.

At block 326, the method 300 may end.

At this point it should be noted that multiplexing encrypted backups in accordance with the present disclosure as described above typically involves the processing of input data and the generation of output data to some extent. This input data processing and output data generation may be implemented in hardware or software. For example, specific electronic components may be employed in a backup mechanism or similar or related circuitry for implementing the functions associated with determining join criteria in accordance with the present disclosure as described above. Alternatively, one or more processors operating in accordance with instructions may implement the functions associated with multiplexing two or more data streams in accordance with the present disclosure as described above. If such is the case, it is within the scope of the present disclosure that such instructions may be stored on one or more processor readable media (e.g., a magnetic disk, magnetic tape, optical disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in is addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for providing multiplexed data for backup comprising:
    determining one or more criteria for a set of data to be backed up by a backup device, wherein the one or more criteria are based at least in part on reducing encryption overhead for the set of data;
    identifying a plurality of sets of unencrypted data previously associated with a same encryption key to form a multiplexed backup based upon the plurality of sets of unencrypted data meeting the one or more criteria, wherein the same encryption key is usable for at least two sets of data having different content, and wherein the identification is performed based at least in part on receiving the encryption key from backup management software, the encryption key being associated with each of the plurality of sets of unencrypted data; and
    transmitting the plurality of identified sets of data to the backup device for backup.

2. The method of claim 1, wherein encryption is performed by the backup device.

3. The method of claim 1, wherein encryption is performed by a client of the backup device.

4. The method of claim 1, further comprising caching data of the one or more identified sets of data prior to transmitting the one or more identified sets of data to the backup device for backup.

5. The method of claim 1, further comprising compressing the one or more identified sets of data prior to encryption.

6. The method of claim 2, wherein SCSI security protocol out (SPOUT) is utilized to facilitate encryption on the backup device.

7. The method of claim 2, wherein a key identifier associated with encrypted data of a backup medium is stored in a data header on the backup medium.

8. The method of claim 2, wherein a key identifier associated with encrypted data of a backup medium is stored in key associated data on the backup medium.

9. The method of claim 1, wherein encryption is performed utilizing software based encryption.

10. The method of claim 1, wherein encryption is performed utilizing hardware based encryption.

11. At least one non-transitory processor readable storage medium storing a computer program of instructions configured to be readable by at least one processor for instructing the at least one processor to execute a computer process for performing the method as recited in claim 1.

12. An article of manufacture for providing multiplexed data for a backup, the article of manufacture comprising:
    at least one processor readable medium; and
    instructions carried on the at least one medium;
    wherein the instructions are configured to be readable from the at least one medium by at least one processor and thereby cause the at least one processor to operate so as to:
        determine one or more criteria for a set of data to be backed up by a backup device, wherein the one or more criteria are based at least in part on reducing encryption overhead for this set of data;
        identify a plurality of sets of unencrypted data previously associated with a same encryption key to form a multiplexed backup based upon the plurality of sets of unencrypted data meeting the one or more criteria, wherein the same encryption key is usable for at least two sets of data having different content, and wherein the identification is performed based at least in part on receiving the encryption key from backup management software, the encryption key being associated with each of the plurality of sets of unencrypted data; and
        transmit the plurality of identified sets of data to the backup device for backup.

13. A system for providing multiplexed data for a backup comprising:
    one or more processors communicatively coupled to a network; wherein the one or more processors are configured to:
        determine one or more criteria for a set of data to be backed up by a backup device, wherein the one or more criteria are based at least in part on reducing encryption overhead for the set of data;
        identify a plurality of sets of unencrypted data previously associated with a same encryption key to form a multiplexed backup based upon the plurality of sets of unencrypted data meeting the one or more criteria, wherein the same encryption key is usable for at least two sets of data having different content, and wherein the identification is performed based at least in part on receiving the encryption key from backup management software, the encryption key being associated with each of the plurality of sets of unencrypted data; and
        transmit the plurality of identified sets of data to the backup device for backup.

14. The system of claim 13, wherein the backup device utilizes magnetic tape.

15. The system of claim 13, wherein the backup device utilizes optical storage.

16. The system of claim 13, further comprising storage for caching data of the one or more identified sets of data prior to transmitting the one or more identified sets of data to the backup device for backup.

17. The system of claim 13, wherein SCSI security protocol out (SPOUT) is utilized to facilitate encryption on the backup device.

18. The system of claim 13, wherein a key identifier associated with encrypted data of a backup medium is stored in at least one of: a data header on the backup medium and key associated data on the backup medium.

19. The method of claim 1, wherein the one or more criteria include at least one of: the source of the data, the size of the data to be backed up, and the owner of the data.

* * * * *